United States Patent

Izumi

[15] 3,707,697
[45] Dec. 26, 1972

[54] INTERCHANGEABLE ELECTRICAL DEVICE

[72] Inventor: John Izumi, 105 E. Ohio Street, Chicago, Ill. 60611

[22] Filed: June 9, 1971

[21] Appl. No.: 151,267

[52] U.S. Cl.............339/14 R, 339/21 R, 339/22 B, 339/147 R
[51] Int. Cl................................................H01r 3/06
[58] Field of Search...339/14 R, 19, 22 R, 22 B, 147, 339/156, 122, 21, 23, 24; 174/51, 59; 317/118, 119

[56] References Cited

UNITED STATES PATENTS

| | | | |
|---|---|---|---|
| 3,651,245 | 3/1972 | Moll | 174/51 |
| 3,609,647 | 9/1971 | Castellano | 339/122 |
| 3,353,137 | 11/1967 | Miller | 339/14 |
| 2,433,917 | 1/1948 | McCartney | 339/122 R |

Primary Examiner—Stephen J. Novosad
Assistant Examiner—Robert A. Hafer
Attorney—Merriam, Marshall, Shapiro & Klose

[57] ABSTRACT

An electrical connecting and mounting frame for use in standard 115 AC electrical wiring systems, the frame containing a series of conductors disposed within an insulating block, openings in the block through which wiring devices such as AC outlets, switches and pilot lights can be releasably mounted to the block and simultaneously electrically connected to the respective conductors in the block, the block further containing means for connecting the conductors therein to the hot, neutral and earth ground wires in a standard 115 volts AC supply.

5 Claims, 7 Drawing Figures

PATENTED DEC 26 1972  3,707,697

INVENTOR
JOHN IZUMI
BY Merriam, Marshall, Shapiro & Klose
ATTORNEYS

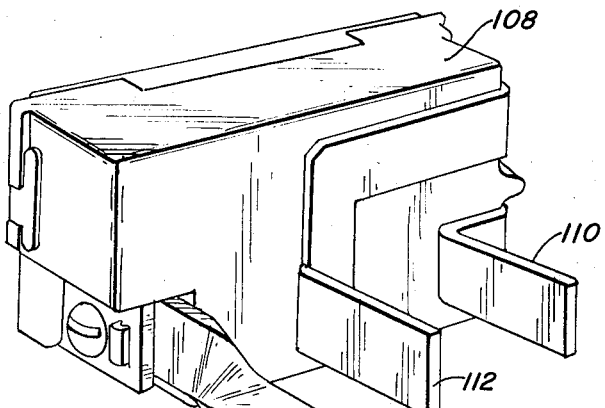
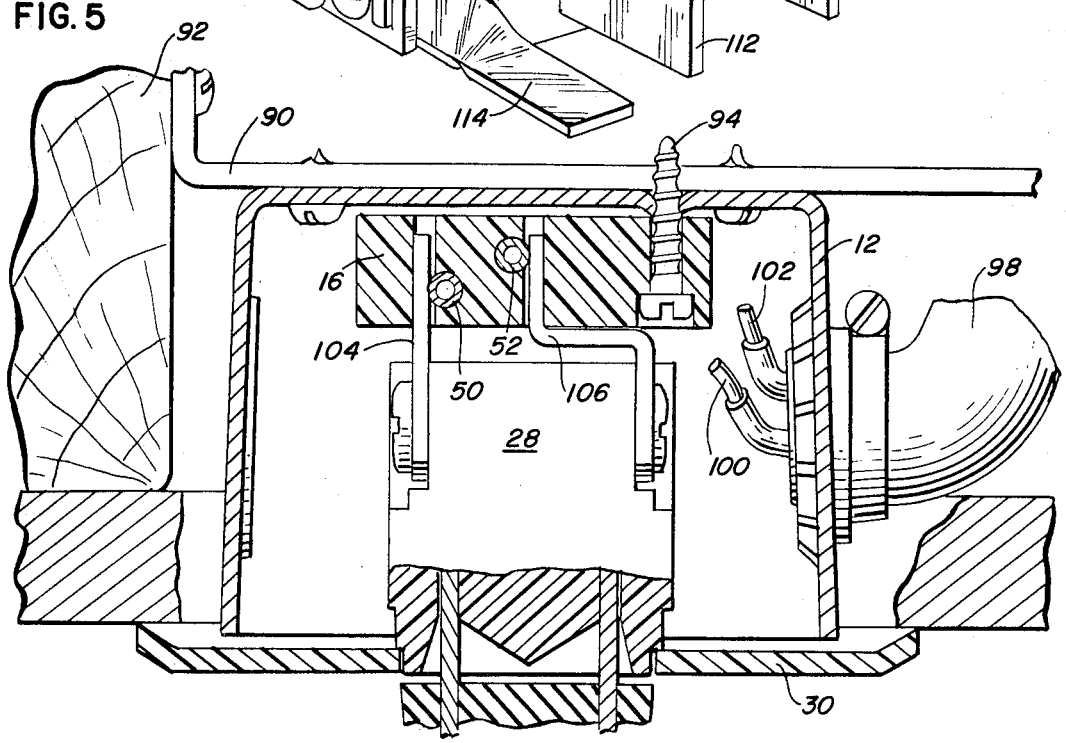
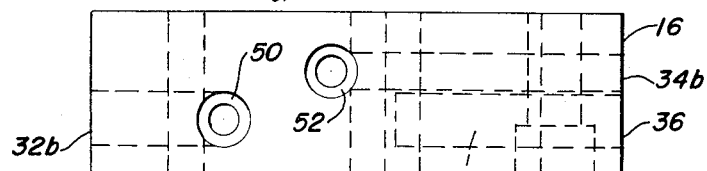
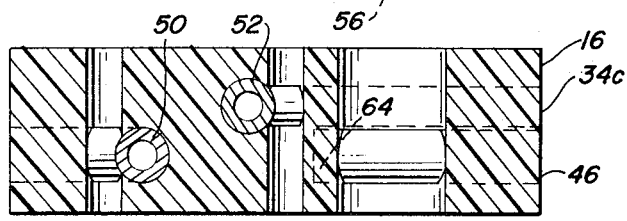

INTERCHANGEABLE ELECTRICAL DEVICE

This invention relates to electrical wiring apparatus, and more particularly to an electrical wiring device which can be utilized for interchangeably electrically connecting and mounting electrical switches, outlets, indicating lamps, etc.

Many devices are currently available for permitting the mounting of switches, receptacles, pilot lights, etc., in a mounting bracket or supporting bridge, with the bracket being secured in a conduit terminal box. Various means exist for maintaining the wiring devices in position on the mounting bracket, such means normally consisting of lugs, hooks, tabs, etc. on the bracket or wiring device and movable for locking type contact with the opposite member. Standard wiring is then utilized to connect the various devices to the electrical system. If desired, in most instances the wiring devices can be unlocked from their mounting position on the bracket and interchanged and locked in place on a new position on the bracket.

SUMMARY OF THE INVENTION

In accordance with the principles of the present invention, there is provided a mounting frame for simultaneous electrically connecting and mounting any one of a plurality of electrical wiring devices thereto. In particular, there is provided an electrical connecting and mounting frame containing a series of conductors disposed within an insulating block, the block containing openings through which wiring devices such as AC outlets, switches and pilot lights can be releasably mounted to the block and simultaneously electrically connected to the respective conductors within the block. Means are also provided on the block for connecting the conductors to the three wires in a standard 115 volts AC type supply, that is, the normally hot, neutral and earth ground leads. Additional terminal means are provided for connecting the wiring devices to other than the hot, neutral and ground leads of the power supply system.

BRIEF DESCRIPTION OF THE DRAWINGS

FIG. 4 is a perspective view of a wiring device containing prongs for mounting and electrically connecting the wiring device to the frame;

FIG. 5 is a sectional view illustrating the mounting frame and wiring devices in position in a terminal box such as shown in FIG. 2;

FIG. 6 is an elevational view of the frame structure shown in FIG. 3; and

FIG. 7 is a sectional view of the frame taken along section lines 7—7 as shown in FIG. 3.

DETAILED DESCRIPTION

Figure 1:
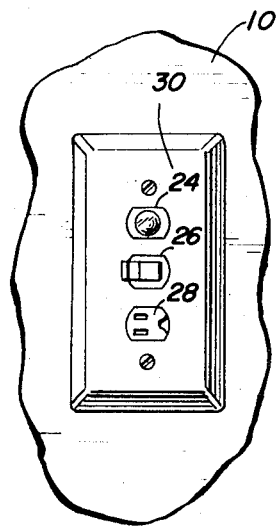
FIG. 1 is a fragmentary view illustrating the pilot light, switch and outlet mounted in a 115 volts AC electric wiring system embodying the present invention.
Figure 2:
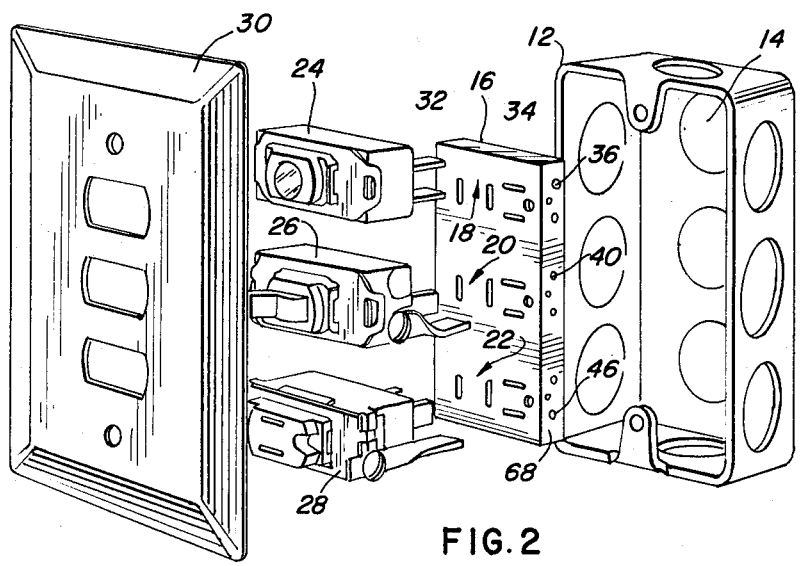
FIG. 2 is an exploded view illustrating the novel electrical connecting and mounting frame constructed in accordance with the present invention for mounting the illustrated wiring devices in a standard terminal box with wall plate.

Referring now to the drawings, a specific embodiment of the present invention as therein illustrated will be described. FIGS. 1 and 2 illustrate a wall 10 within which there is mounted a standard terminal box 12 containing a series of knockouts 14 for coupling a conduit carrying electrical wires to one or more wiring devices to be mounted within the box 12.

In accordance with the principles of the present invention, there is provided an electrical connecting and mounting frame 16 with mounting positions designated as 18, 20, 22 for electrically connecting and mounting as many as three separate wiring devices to mounting block 16. As an example, FIG. 2 illustrates a pilot indicating light 24 to be mounted in position 18; a switch 26 to be mounted in position 20 and an outlet 28 to be mounted in position 22. The standard wall cover plate 30 forms a standard cover for the terminal box 12.

The novel mounting frame 16 includes terminals 32, 34 for connection to the normal hot and neutral (common) wires of the 115 volt AC electrical system being supplied to terminal box 12. Terminals 36 through 46 are also supplied on mounting frame 16 for interconnecting the wiring devices 24, 26, 28 or for connecting such wiring devices to points in the electrical system other than the hot, neutral or ground wires.

Figure 3:
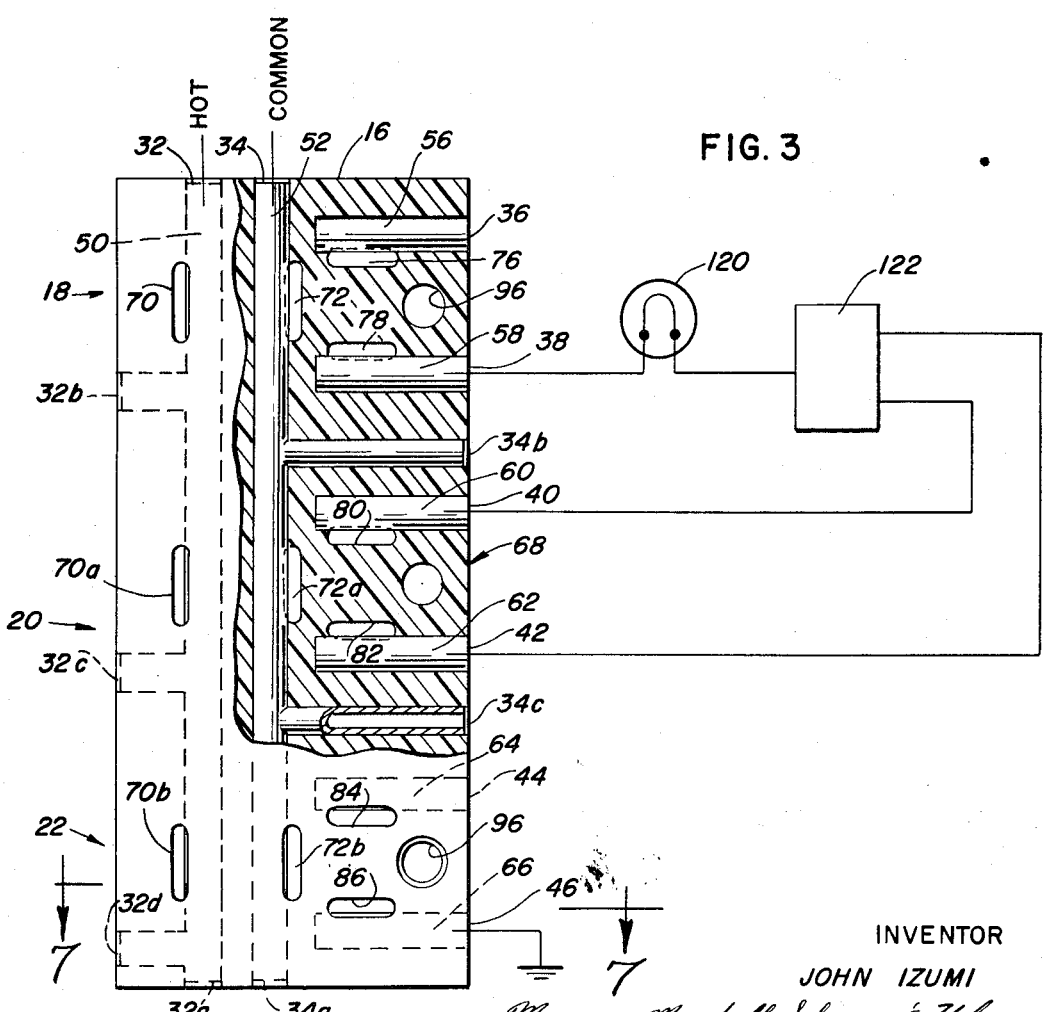
FIG. 3 is a plan view, partly in section, illustrating the details of construction of the novel wiring device connecting and mounting frame in accordance with the principles of the present invention, with a schematic illustration of connections in a standard three wire 115 volt AC type system.

The construction details of the novel mounting frame 16 in accordance with the principles of the present invention are shown most clearly with reference to FIGS. 3, 6 and 7. The mounting frame 16 is formed of a block of non-conductive material. Within the insulating block there is disposed a pair of longitudinal conductors 50, 52, both of which extend longitudinally from one end of the block to the other. The insulating block forming mounting frame 16 contains suitable openings therein enabling terminal means such as terminal 32 at one end of conductor 50 to be connected to one of the three wires of a standard supply system, such as the illustrated hot lead. Similar openings in the insulating block 16 have been provided at the opposite end of conductor 50 and along the sides of the insulating block 16, and these have been illustrated as the additional terminals 32a, b, c and d.

Similarly, longitudinal conductor 52 extends from the terminal 34 provided through an opening in insulating block 16 at one end, to the other end of insulating block 16 with additional terminals 34a at the bottom of the block and 34b, c located at the sides of the block. For purposes of illustration, the conductor 52 is shown as connected through terminal 34 to the neutral or common lead of the standard 115 volt supply.

Also mounted within the insulating block 16 is a series of conductors 56, 58 through 66 mounted within the block transversely to the longitudinally extending conductors 50, 52. Suitable openings at the side 68 of insulating block 16 have been provided for terminals 36, 40, 42, 44, 46 associated respectively with the transverse conductors 56 through 66. The transverse conductors 56–66 have been provided for connecting the wiring devices to the third ground wire of the supply system as shown connected to terminal 46 of transverse conductor 66. Additionally, the transverse conductors 56–66 can be used to interconnect the various wiring devices mounted to the mounting block 16.

Simultaneous mounting and electrical connection means are provided in the block 16 such that as each of the wiring devices 24, 26, 28 is mounted to the block, an electrical connection is simultaneously made with the desired conductors 50, 52 or 56–66. As can be seen most readily from FIG. 3, a series of longitudinal slots 70, 70a and 70b associated respectively with the mounting positions 18, 20 and 22 is provided through the insulating block 16 immediately adjacent and in communication with the longitudinal conductor 50. A similar set of slots 72, 72a and 72b is located at the respective mounting positions 18, 20, 22 in communication with the longitudinal conductor 52. Also illustrated is slot 76 communicating with transverse conductor 56; slot 78 communicating with transverse conductor 58; etc., to slot 86 communicating with conductor 66.

The various slots just described are utilized to receive the prongs associated with each of the wiring devices. For instance, reference may be made to FIG. 5 wherein there is shown terminal box 12 mounted by conventional means 90 to a wall stud 92. Connecting and mounting frame 16 is attached to the terminal box 12 by means of a screw or screws 94 inserted through apertures 96 in frame 16 and threadably engaging terminal box 12. Conduit means 98 containing wires 100, 102 are coupled to the terminal box so that the wires 100, 102 may engage terminals 32, 52 associated with the hot conductor 50 and neutral conductor 42 within the frame 16. A wiring device, such as the outlet receptacle 28 is shown mounted to frame 16 and electrically connected to the hot and neutral conductors in the system by the insertion of prongs 104, 106 into the respective slots 70, 72. As illustrated in FIG. 5, insertion of prongs 104, 106 into the respective slots enables the prong to electrically contact conductors 50, 52. In addition, it is to be noted that the slots are sized so as to urge the prongs into firm and secure contact with the conductors 50, 52 thereby enabling a secure mechanical and electrical connection.

Whereas FIG. 5 only illustrates connection to two conductors of the frame, it must be realized that any one of the wiring devices 24, 26, 28 can be interchangeably mounted as desired to the mounting frame. For instance, FIG. 4 illustrates a three wire device which can be a three wire outlet type receptacle containing a socket to be connected to earth ground of the electrical system. In this case, the wiring device 108 can be mounted in the mounting position 22 which as is shown in FIG. 3 contains a slot 70b for connection to hot conductor 50; a slot 72b for connection to neutral conductor 52 and slot 86 for connection to conductor 66 which is as illustrated is connected to earth ground in the electrical system through terminal 46. Thus, prong 110 of the wiring device 108 would be inserted into slot 70b; prong 112 would be inserted into slot 72b and prong 114 would be inserted into slot 86.

As a further illustration of utilization of the remaining transverse conductors on frame 16 for interconnecting various wiring devices mounted thereto, reference may be made to FIG. 3 wherein there is schematically illustrated a pilot indicating lamp 102 and a three wire switch 122 mounted to the frame 16. As indicated schematically in FIG. 3, the pilot indicating lamp 120 would be mounted in mounting position 18 with one lead releasably secured in slot 78 so as to engage transverse conductor 58. Either the hot or neutral supply lead can then be connected to conductor 58 through terminal 38. The other prong of pilot light 120 can be inserted into slot 76 to engage transverse conductor 56. The three way switch 122 includes two prongs which respectively engage transverse conductors 60, 62 for connection through terminals 40, 42 with the remaining portion of the switch circuit. A lead must then be extended from terminal 36 to connect to the remaining contact point of the three way switch 122.

As can be readily seen from the drawings, the various wiring devices can be readily interchanged wherein mounting positions 17, 20 and 22 are in the frame 16. In some instances the various interconnections made through the terminals 36–46 may also have to be interchanged. Standard wiring devices currently in use can readily be modified if desired to obtain a structure shown in FIG. 4 for use within frame 16. In the alternative, such wiring devices can readily be manufactured to incorporate the required prongs for releasably securing and electrically connecting such wiring devices to the frame 16. One of the primary advantages of such a system is that in the event one of wiring devices become defective, it can be readily replaced by simply removing wall plate 30, unplugging the defective wiring device from frame 16, and inserting the new one.

The foregoing detailed description has been given for clearness of understanding only, and no unnecessary limitations should be understood therefrom, as modifications will be obvious to those skilled in the art.

What is claimed is:

1. In an AC electrical wiring system, a wiring device mounting frame for simultaneously electrically connecting and mounting any one of a plurality of electrical wiring devices thereto, said frame comprising:

a block of electrically non-conductive material having top and bottom surfaces and first and second pairs of respective opposite side surfaces;

a plurality of mounting positions on said block for mounting said wiring devices;

at least two elongated electrical conductors disposed in said block and extending continuously through each of said mounting positions;

first terminal means associated with one of said elongated conductors in said block for enabling connection of said elongated conductor to one of said AC electrical wires;

second terminal means associated with the other of said elongated conductors in said block for enabling connection of said other elongated conductor to another of said AC electrical wires;

a series of additional electrical conductors disposed in said block, at least one of said additional conductors disposed at each of said mounting positions;

said additional electrical conductors extending from one of said side surfaces towards the other of said first pair and transversely in said block with respect to the two elongated conductors;

respective third terminal means associated with each of said series of additional electrical conductors for enabling respective electrical wiring connections thereto;

said third terminal means comprising a respective terminal in said one side surface associated with each of said conductors; and simultaneous mounting and electrical connection means, at each of said mounting positions for releasably mounting said wiring devices to said block, including means for electrically connecting said wiring devices to respective ones of said electrical conductors at said mounting positions when said wiring devices are releasably mounted to said block.

2. A wiring device mounting frame as claimed in claim 1, wherein said simultaneous mounting and electrical connection means includes at least one slot extending through at least one of said top and bottom surfaces of said block, adjacent and in communication with each of said conductors at said mounting positions.

3. A wiring device mounting frame as claimed in claim 2, wherein said simultaneous mounting and electrical connection means further includes means associated with each slot for maintaining said wiring device in releasably secure electrical contact with the respective conductor when said wiring device is mounted on said block.

4. A wiring device mounting frame as claimed in claim 3, wherein said first terminal means includes a respective terminal in each of said second pair of opposite side surfaces of said block and further respective terminals in one of said opposite side surfaces of said first pair at each of said mounting positions on said block, whereby additional wiring connections may be made to one of said elongated conductors.

5. A wiring device mounting frame as claimed in claim 4, wherein said second terminal means includes a respective terminal in each of said first pair of opposite side surfaces of said block and at least two additional terminals in the other of said opposite side surfaces of said first pair, whereby additional wiring connections may be made to the other of said elongated conductors.

* * * * *